United States Patent
Warnsat et al.

(10) Patent No.: US 9,173,379 B1
(45) Date of Patent: Nov. 3, 2015

(54) HARNESSES FOR DOGS AND OTHER ANIMALS

(71) Applicant: Innovative Pet Products LLC, Plant City, FL (US)

(72) Inventors: Trisha J Warnsat, San Martin, CA (US); James B Sampson, III, Plant City, FL (US)

(73) Assignee: Innovative Pet Products LLC, Plant City, FL (US)

( * ) Notice: Subject to any disclaimer, the term of this patent is extended or adjusted under 35 U.S.C. 154(b) by 0 days.

(21) Appl. No.: 14/617,703

(22) Filed: Feb. 9, 2015

Related U.S. Application Data (63) Continuation of application No. 13/897,381, filed on May 18, 2013, now Pat. No. 8,950,364.

(60) Provisional application No. 61/649,177, filed on May 18, 2012, provisional application No. 61/783,898, filed on Mar. 14, 2013.

(51) Int. Cl.
*A01K 27/00* (2006.01)

(52) U.S. Cl.
CPC .................................. *A01K 27/002* (2013.01)

(58) Field of Classification Search
CPC . A01K 27/001; A01K 27/002; A01K 27/003; A01K 27/005; A01K 27/00; Y10S 119/905; Y10S 119/907
USPC .......................... 119/856, 863, 792, 793, 864
See application file for complete search history.

(56) References Cited

U.S. PATENT DOCUMENTS

| | | | | |
|---|---|---|---|---|
| 883,384 A | * | 3/1908 | Bremer | 119/858 |
| 904,530 A | | 11/1908 | Harlow | |
| 1,474,231 A | * | 11/1923 | Brown | 119/831 |
| 4,917,049 A | * | 4/1990 | Peterson | 119/864 |
| 4,993,215 A | * | 2/1991 | Schutte | 54/19.3 |
| D317,217 S | | 5/1991 | Beutler | |
| 5,317,989 A | * | 6/1994 | Swanson et al. | 119/792 |
| 5,325,819 A | * | 7/1994 | Krauss | 119/792 |
| 5,379,726 A | | 1/1995 | Mann | |
| 5,383,426 A | * | 1/1995 | Krauss | 119/793 |
| 5,785,010 A | * | 7/1998 | Koch | 119/863 |
| 5,865,148 A | * | 2/1999 | Aguirre et al. | 119/856 |
| D421,669 S | | 3/2000 | Moehring | |
| D431,696 S | | 10/2000 | Constantino | |

(Continued)

OTHER PUBLICATIONS

Wiggles Wags and Whiskers Freedom no-pull harness Webpage http://www.gohealthypet.com/category-s/1057.htm accessed Aug. 13, 2104.

(Continued)

*Primary Examiner* — Yvonne Abbott-Lewis
(74) *Attorney, Agent, or Firm* — Edward B. Weller (57) ABSTRACT

A body collar is configured to fit around a body of an animal and comprises a collar strip, a first ring and a buckle. The first ring is attached to the collar strip. First and second portions of the buckle are attached to respective first and second ends of the collar strip. The first portion of the buckle and the second portion of the buckle are configured to be removably attached to each other in a configuration of the body collar being fitted around the body of the animal. The first portion of the buckle to be inserted through a second ring of a neck collar and fit around the body of the animal through a third ring of the neck collar to be removably attached to the second portion of the buckle.

18 Claims, 11 Drawing Sheets

(56) References Cited

U.S. PATENT DOCUMENTS

| | | | |
|---|---|---|---|
| 6,129,055 A * | 10/2000 | Hanada | 119/863 |
| 6,308,663 B1 * | 10/2001 | Philen et al. | 119/864 |
| 6,595,156 B1 * | 7/2003 | Curran | 119/792 |
| 7,051,682 B2 * | 5/2006 | Clute et al. | 119/864 |
| 7,103,943 B2 * | 9/2006 | Lambert | 24/298 |
| 7,107,939 B2 * | 9/2006 | Lady | 119/792 |
| 7,165,511 B1 | 1/2007 | Brezinski | |
| 7,243,615 B1 * | 7/2007 | Hendrie | 119/792 |
| 7,886,699 B2 | 2/2011 | Lady | |
| 7,891,322 B2 * | 2/2011 | Bennett et al. | 119/856 |
| 8,281,748 B2 * | 10/2012 | Elkins et al. | 119/792 |
| D698,503 S | 1/2014 | Fidrych et al. | |

OTHER PUBLICATIONS

CE Canine Equipment Harnesses Webpage http://www.rcpets.com/Harnesses/Department.aspx?DeptID=6 accessed Aug. 13, 2014.

RC Pet Canine Equipment Webpage http://greatoutdogs.com/RC-Pet-Canine-Equipment-No-Pull-Harness-for-Dogs.html accessed Aug. 13, 2104.

* cited by examiner

HARNESSES FOR DOGS AND OTHER ANIMALS

RELATED APPLICATIONS

This application is a continuation of U.S. patent application Ser. No. 13/897,381, which is incorporated by reference herein in its entirety.

This application claims the benefit of, and priority under 35 USC §119(e) from and is related to U.S. provisional application No. 61/649,177, which is incorporated by reference herein in its entirety.

This application claims the benefit of, and priority under 35 USC §119(e) from and is related to U.S. provisional application No. 61/783,898, which is incorporated by reference herein in its entirety.

FIELD

The present invention relates to harnesses, and more particularly to harnesses for dogs and other animals.

BACKGROUND

Current harnesses and restraint devices, on the market, require joining two, tightly fitting plastic buckle pieces, on the side of, or under a dog, where it is difficult to see the buckle, much less fasten it. Most are designed to fit the dog's body in a fit that is tight to the body or head of the dog, making them even more difficult to attach. Most are not effective in providing the dog with a deterrent to pulling away from its handler. Most rely on a front-connect assembly which restricts the movement of the dog's front legs which can be injurious and can affect the dog's natural gait. The most powerful collars that rely on a tightening prong system require that metal prongs be fitted together and taken apart, each time the collar is used; this is nearly impossible for people with any impairment in their hands, strength, coordination or vision. This type of collar can cause injury to both the person assembling it onto the dog and the dog in motion. Additionally, metal collars have been known to cause fatal injury when a dog wearing one plays with another dog. If a dog gets a tooth or jaw entangled in the metal or prong collar, it has been known to twist on the wearer's neck making it impossible to remove and resulting in the strangulation of the dog. Metal collars cannot be cut off in an emergency.

What is needed is a system and method for a safe and an effective harness that is easier to attach to the dog or animal and to use, while effectively discouraging the dog from pulling away from the handler, without impeding the dog's natural gait or injuring the dog.

SUMMARY

In one aspect, the harness provides a dog walking restraint/training system that is easily applied by any person, even someone who is vision impaired or with limited dexterity in their hands.

In some aspects, a harness comprises a neck collar and a body collar. The neck collar includes two rings (such as O-rings) that may be of identical size. The rings are near a buckle on the neck collar when the neck collar is fastened, instead of centered. The two rings are attached on opposite ends of a first collar portion. Each of the second and third collar portions has a first end attached to a corresponding ring and a second end. The second ends of the second and third collar portions are removably attachable to each other, such as by a buckle attached to the second ends of the second and third collar portions. The neck collar is configured to fit around the neck of an animal. The two rings are configured so that either ring can be coupled to a leash when not used with the body collar.

In one embodiment, the body collar includes a collar strip, a third ring (such as an O-ring), which has one end attached to a slide adjuster and another end attached to a clip, such as a swivel clip. The third ring is moveable in a loop formed on the collar strip by the slide adjuster. The third ring has an outer diameter larger than the inner diameters of the first and second rings so that the third ring is too large to fit through either of the first and second rings. The strip is adjustable in a conventional manner by sliding the slide adjuster toward or away from the clip to cause the strip to be doubled over itself. The third ring is not fixed to the strip so as to be able to be at the point on the strip farthest from the clip. The collar strip is configured to be inserted through the first ring and to fit around the body of an animal. The clip is configured to be removably attached to the third ring in a first configuration and to either the first or second rings of the neck collar in a second configuration. The body collar may include a slide adjuster to adjust the body collar around the body of the animal.

In one embodiment, the clip and the body collar strip are inserted through either ring of the neck collar from the top of the collar downward. The body collar strip is wrapped around the body of the animal, behind the front legs and up the other side of the animal to the second neck collar ring, and the clip is attached to the second ring of the neck collar in a first configuration or inserted through the second ring of the neck collar and attached to the body collar in a second configuration. The second configuration allows the collar strip to tighten around the body of the animal if the animal pulls on the harness. Both configurations allow the collar strip to pull back on the animal's neck as the body collar strip tightens around the animal's body in a uniform and roughly even action.

In one embodiment, a harness comprises a neck collar and a body collar. The neck collar includes first and second rings and first, second, and third collar portions. The first collar portion has a first end attached to the first ring and has a second end attached to the second ring. The second collar portion has a first end attached to the first ring and has a second end. The third collar portion has a first end attached to the second ring and has a second end. The second ends of the second and third collar portions are removably attachable to each other. The neck collar is configured to fit around the neck of an animal. The body collar includes a collar strip, a third ring attached to a first end of the collar strip, a first portion of a buckle attached to the first end of the collar strip, and a second portion of the buckle attached to a second end of the collar strip. The collar strip and the second portion of the buckle are configured to be inserted through the first ring and to fit around the body of an animal. The first portion and the second portion of the buckles are configured to be removably attached to each other in a configuration of the body collar being fitted around the body of the animal.

In one embodiment, the first ring is an O-ring.

In one embodiment, the second ring is an O-ring.

In one embodiment, one of the first and second rings is sized so that the third ring cannot pass through said one first or second ring.

In one embodiment, the second ring is an O-ring.

In one embodiment, the neck collar further comprises a buckle including a first portion coupled to the second end of the second collar portion and a second portion coupled to the second end of the third collar portion.

In one embodiment, the first ring and the second ring are spaced apart to provide equal or substantially equal tension on the body collar while the body collar is on the animal to apply equal pressure on the neck, and the sides and underside of the body of the animal.

In one embodiment, a body collar comprises a collar strip, a first ring and a buckle. The collar strip has a first end and a second end. The first ring is attached to the collar strip. The buckle includes a first portion attached to the first end of the collar strip, and includes a second portion attached to the second end of the collar strip. The collar strip is configured to be fit around a body of an animal. The first portion of the buckle and the second portion of the buckle are configured to be removably attached to each other in a configuration of the body collar being fitted around the body of the animal.

In one embodiment, the first ring is positioned on the collar strip to allow the first portion of the buckle to be inserted through a second ring of a neck collar and fit around the body of the animal through a third ring of the neck collar to be removably attached to the second portion of the buckle, the neck collar being configured to fit around the neck of the animal.

In one embodiment, the neck collar includes a first collar portion, a second portion, and a third collar portion. The first collar portion has a first end attached to the second ring and has a second end attached to the third ring. The second collar portion has a first end attached to the second ring and has a second end. The third collar portion has a first end attached to the third ring and has a second end. The second ends of the second and third collar portions are removably attachable to each other.

In one embodiment, the neck collar further comprises a buckle including a first portion coupled to the second end of the second collar portion and a second portion coupled to the second end of the third collar portion.

In one embodiment, the second ring and the third ring are spaced apart to provide equal or substantially equal tension on the body collar while the body collar and the neck collar are on the animal to apply equal pressure on both sides of the body of the animal.

In one embodiment, the body collar is configured to operate in an active configuration while a leash is attached to the first ring and to operate in a passive configuration while the leash is attached to the second ring or the third ring.

In another embodiment, a method that includes securing any of the embodiments above to an animal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Various embodiments of the present invention are now described with reference to the figures where like reference numbers indicate identical or functionally similar elements. Also in the figures, the left most digits of each reference number corresponds to the figure in which the reference number is first used.

Reference in the specification to "one embodiment", "an embodiment", "various embodiments" or "some embodiments" means that a particular feature, structure, or characteristic described in connection with these embodiments is included in at least one embodiment of the invention, and such references in various places in the specification are not necessarily all referring to the same embodiment.

Figure 1A:
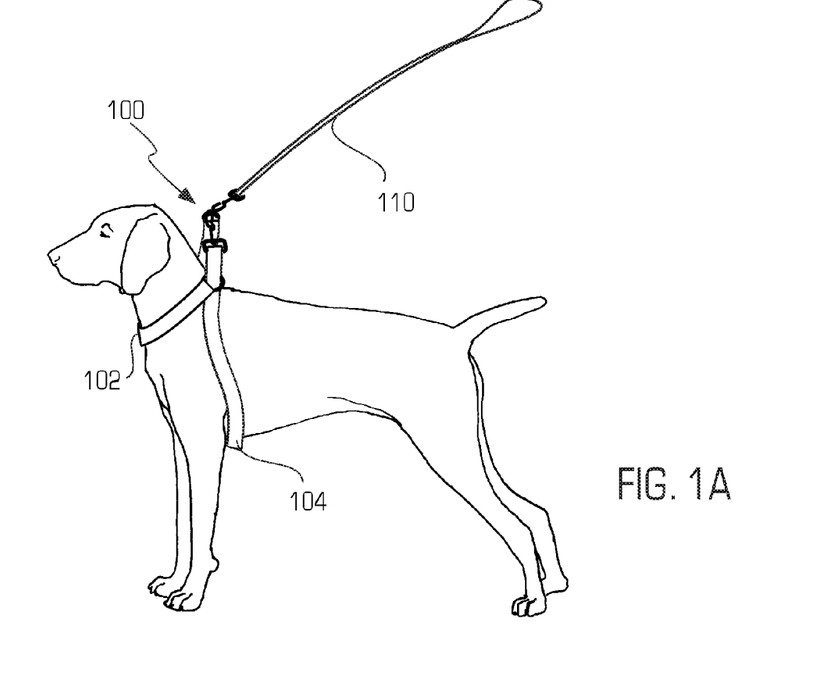
FIGS. 1A and 1B are diagrams illustrating a harness on a dog in accordance with innovations herein.
Figure 1B:
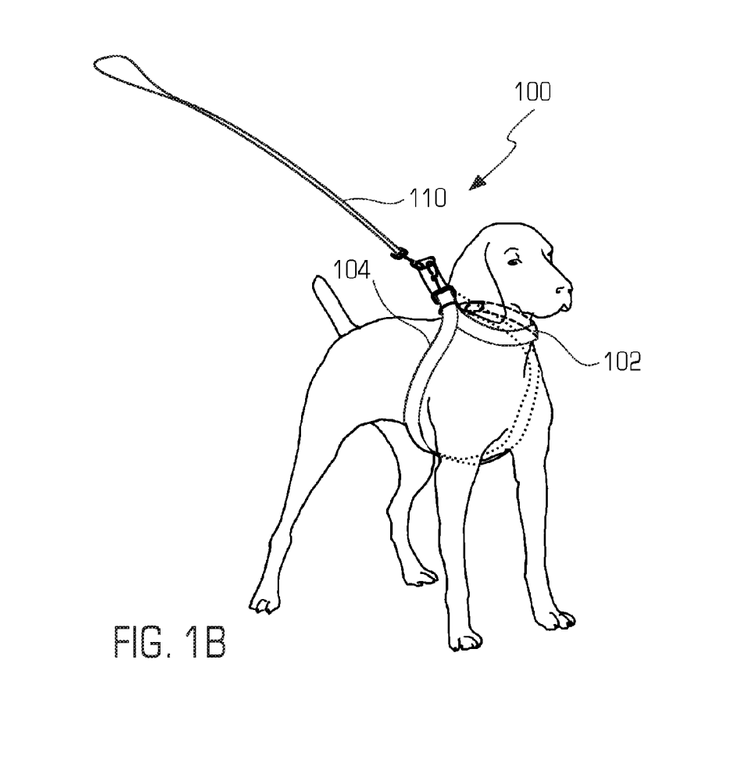

FIGS. 1A and 1B are diagrams illustrating a harness 100 on a dog in accordance with innovations herein. Although the harness 100 is described herein as a dog harness, the harness may be used on other animals. The harness 100 comprises a neck collar 102 and a body collar 104. The neck collar 102 is configured to be disposed and fitted around the neck of the dog. The body collar 104 is configured to be disposed and fitted around the body of the dog. A leash 110 may be attached to the neck collar 102.

Figure 2:
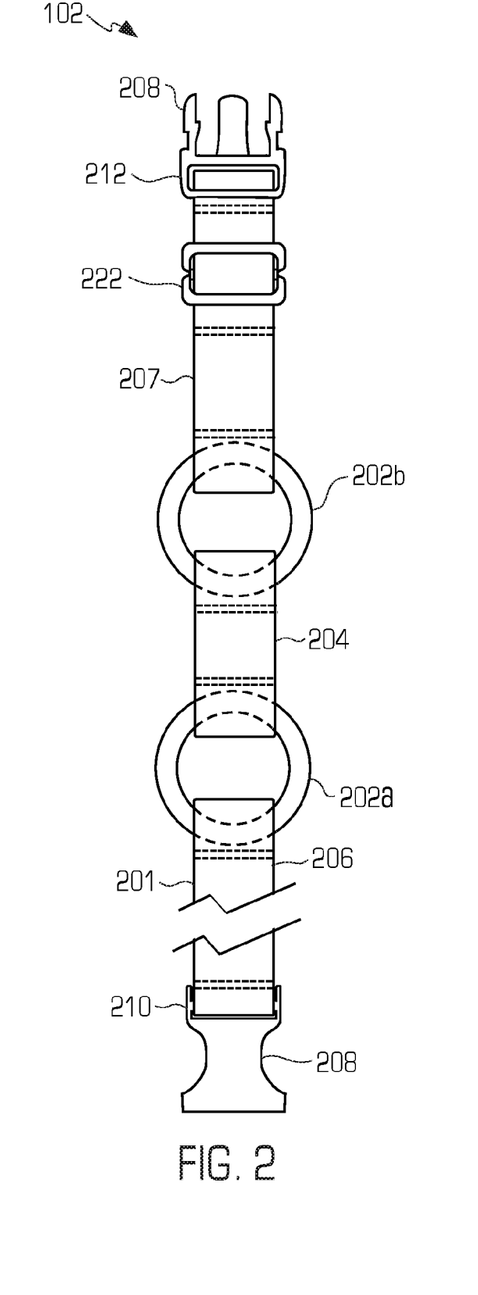
FIG. 2 is a diagram illustrating a neck collar of the harness of FIG. 1.
Figure 4:
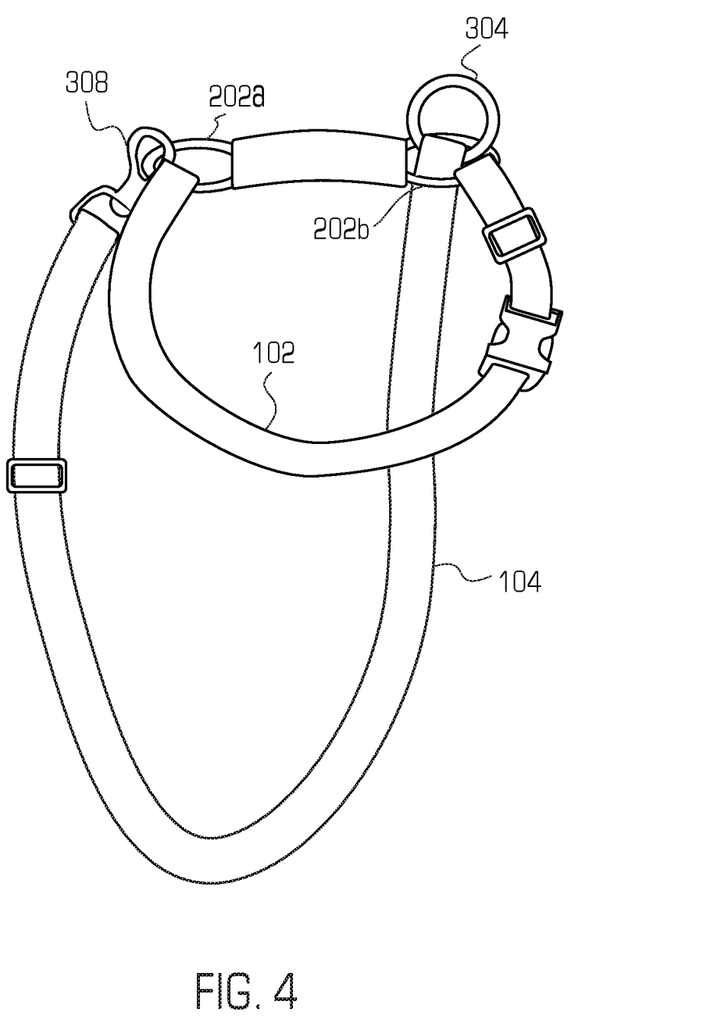
FIG. 4 is a diagram illustrating the harness of FIG. 1 in a passive configuration.
Figure 5:
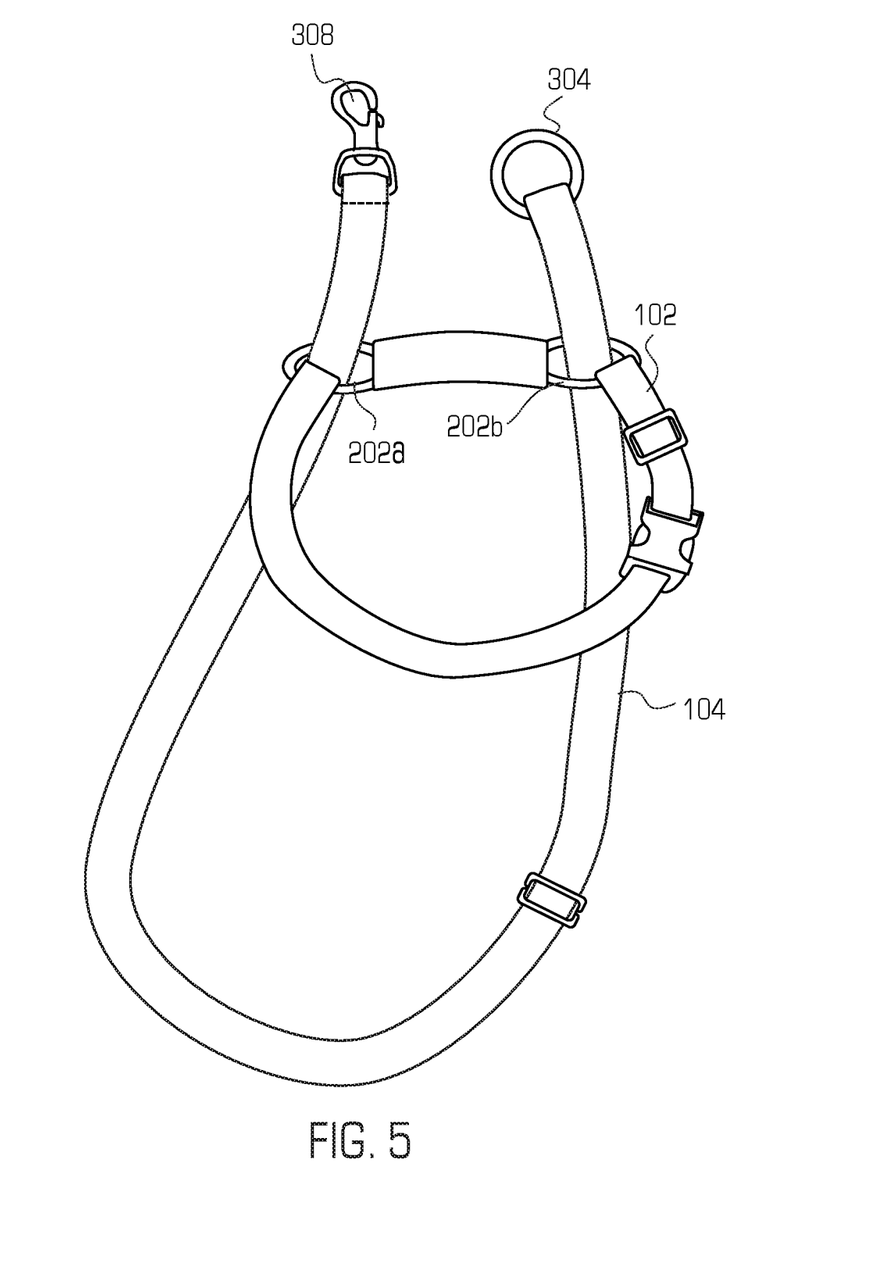
FIG. 5 is a diagram illustrating the harness of FIG. 1 in an active configuration.

FIG. 2 is a diagram illustrating the neck collar 102. The neck collar 102 comprises a collar body 201. In some embodiments, the collar body 201 comprises a plurality of O-rings 202a and 202b, a first collar portion 204, a second collar portion 206, and a third collar portion 207. Although two O-rings 202 are shown, other numbers of O-rings 202 may be used to allow sizing adjustment for the dog. The spacing between the O-rings 202 may be selected based on the size of the dog. In some embodiments, the O-rings 202 may include rings of other shapes, such as a D-ring. The neck collar 102 further comprises a buckle 208 for removably attaching the ends of the neck collar 102 together around the neck of the dog. In some embodiments, the buckle 208 is formed of a female buckle portion 210 and a male buckle portion 212. Other types of buckles may be used. Although the neck collar 102 is described as including a buckle 208, other forms of closing the collar, such as a side release buckle, a click-lock buckle, a carabiner, a seatbelt-type buckle, or Velcro fasteners may be used for securing the neck collar 102 on the dog. FIG. 2 illustrates the buckle 208 in an unfastened configuration. FIGS. 4 and 5 are diagrams illustrating the buckle 208 in a fastened configuration.

The O-ring 202a is attached to a first end of the first collar portion 204 and to a first end of the second collar portion 206. The O-ring 202b is attached to a second end of the first collar portion 204 and to a first end of the third collar portion 207. In some embodiments, the O-rings 202 are attached to the first collar portion 204 by inserting an end of the first collar portion 204 through the corresponding O-ring 202, folding the end of the first collar portion 204 to engage the first collar portion 204 and stitching the first collar portion 204 together. The O-rings 202a and 202b may be attached to the second collar portion 206 and the third collar portion 207 in a similar manner. The female buckle portion 210 and the male buckle portion 212 may be attached to a second end of the second collar portion 206 and the third collar portion 207, respectively. The neck collar 102 further comprises a slide adjuster 222 for adjusting the length of the third collar portion 207 to adjust the length of the neck collar 102.

Figure 7:
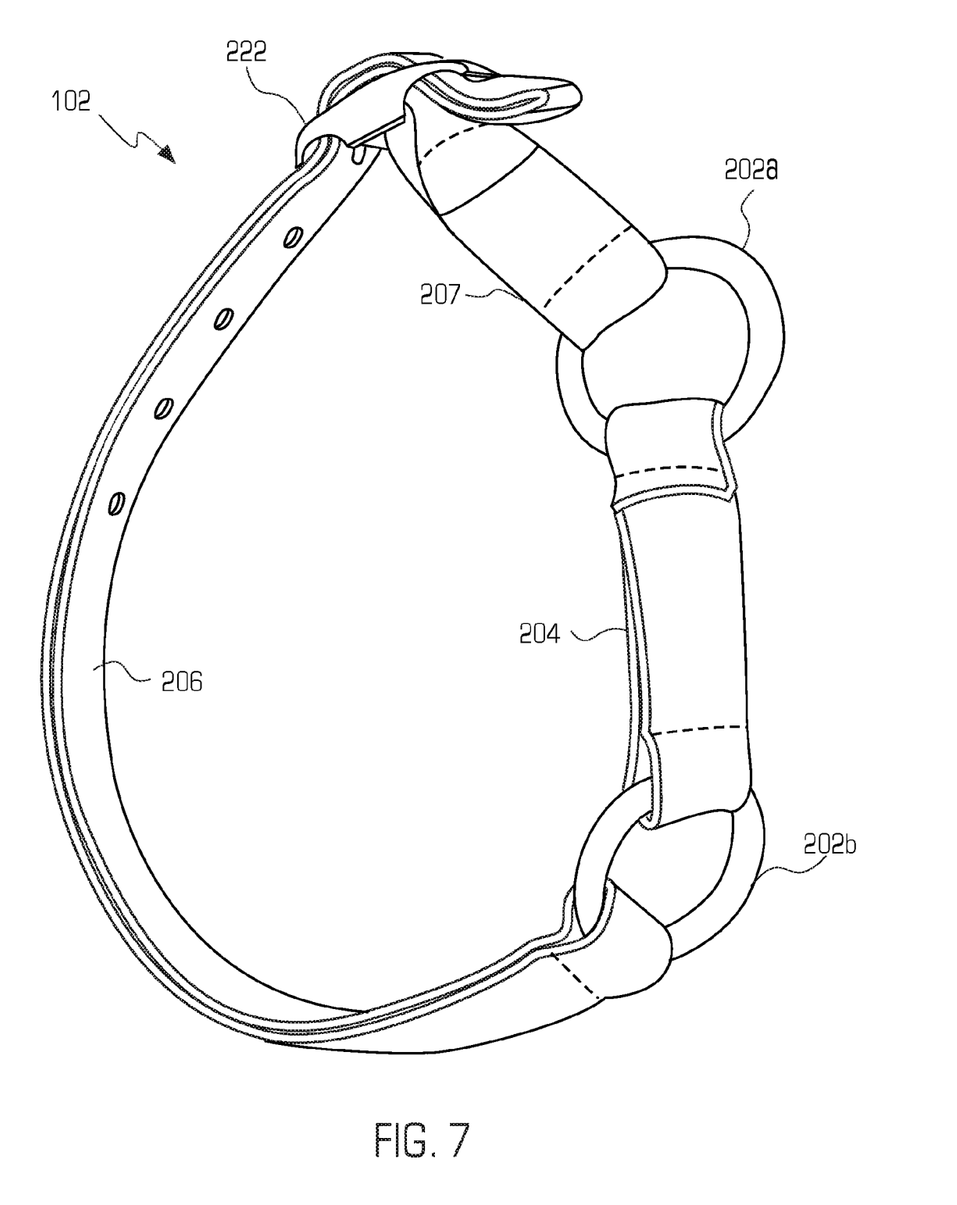
FIG. 7 is a diagram illustrating one embodiment of the neck collar of FIG. 2.

FIG. 7 is a diagram illustrating one embodiment of the neck collar 102.

Figure 3:
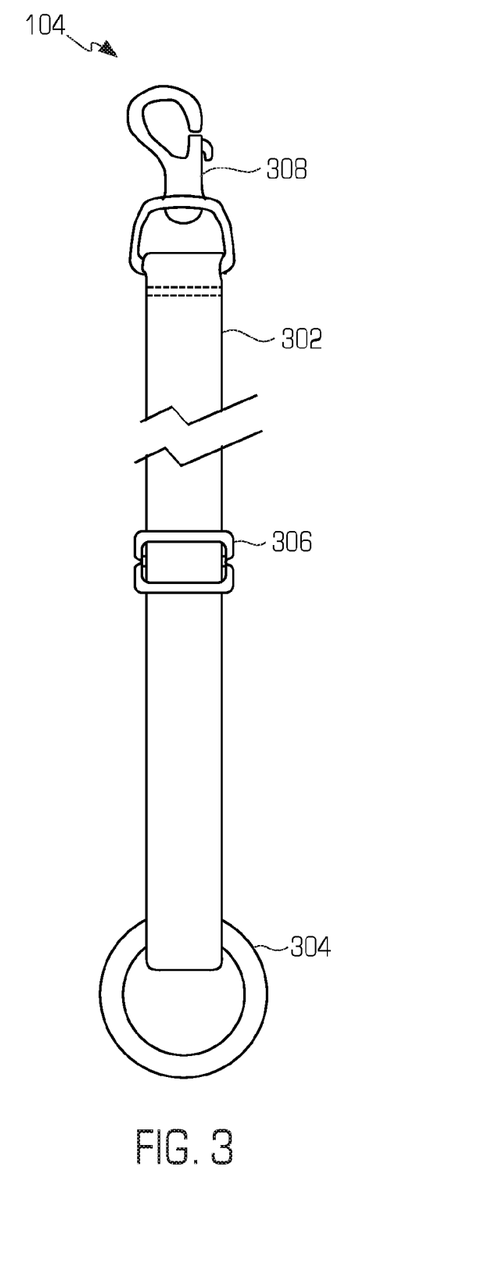
FIG. 3 is a diagram illustrating a body collar of the harness of FIG. 2.

FIG. 3 is a diagram illustrating a body collar 104. The body collar 104 comprises a collar strip 302, a ring 304, a slide adjuster 306, and a clip 308. The collar strip 302 is mounted on a first end to the slide adjuster 306 and mounted on a second end to the clip 308. The collar strip 302 is disposed in the ring 304 and is doubled in the portion of the collar strip 302 between the ring 304 and the slide adjuster 306 so that the ring 304 is free floating in the loop formed by the doubling of the collar strip 302. In some embodiments, the ring 304 has an O-shape, and for simplicity is referred to herein as O-ring 304. In some embodiments, the outer diameter of the O-ring 304 is larger than the inner diameter of the O-rings 202. The slide adjuster 306 adjusts the length of the collar strip 302 that is used to wrap around the body of the dog as described below. The clip 308 may be, for example, a conventional swivel clip used on conventional dog leashes for removably attaching the leash to the collar on the dog.

Figure 6:
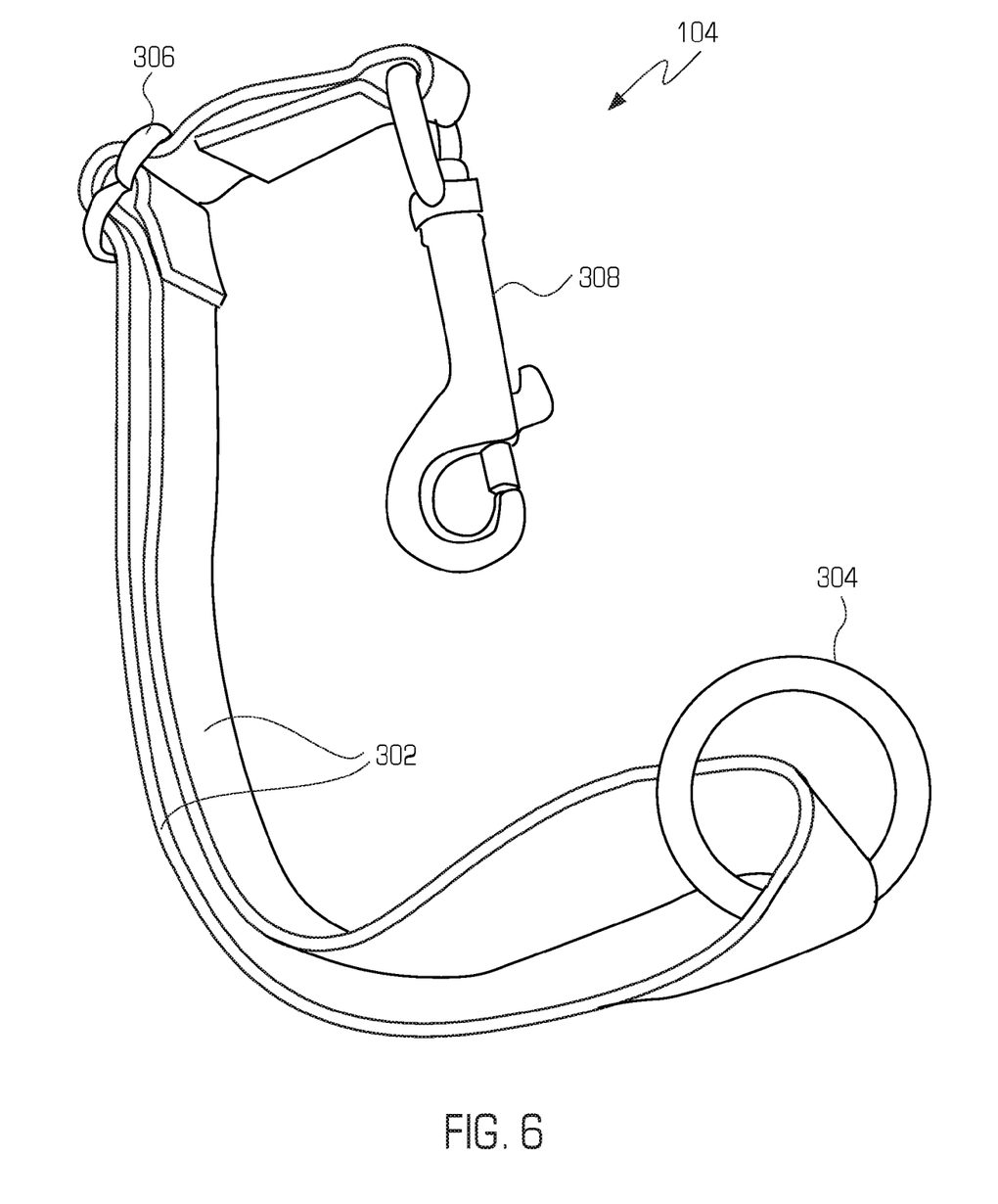
FIG. 6 is a diagram illustrating one embodiment of the body collar of FIG. 3.

FIG. 6 is a diagram illustrating one embodiment of the body collar 104.

Referring again to FIG. 1, the neck collar 102 is fitted around the neck of the dog, for example, with the bottom of the O-ring 202 towards the tail of the dog. The user adjusts the neck collar 102 around the neck of the dog using the buckle 208 in a conventional manner. The neck collar 102 may be left in place and used as a regular collar as desired.

The body collar 104 attaches at the top of the dog's body, easy to see and easy to attach. The user first inserts the clip 308 through one of the O-rings 202 (for simplicity, the O-ring is described as O-ring 202a), and the body collar 104 is placed under and around the body of the dog and up to the other O-ring 202 (for simplicity, the O-ring is described as O-ring 202b).

The harness 100 may be used in an active configuration or a passive configuration. In the active configuration for controlling the dog, the clip 308 is routed up and through the O-ring 202a and attached to the anchored O-ring 304, on the top of the O-ring 202 to restrict the body collar 102 from loosening and releasing the dog. FIG. 5 is a diagram illustrating the body collar 104 through the O-ring 202 in an active configuration.

Alternatively, the harness 100 may be used in a passive configuration in which the clip 308 is attached to the second O-ring 202b. FIG. 4 is a diagram illustrating the harness 100 in a passive configuration. Although the harness 100 is described with reference to O-rings 202a and 202b, the harness 100 is not limited by the selection of which O-ring 202 is first used for inserting the body collar 104.

Referring again to FIG. 1, the body collar 104 may be adjusted using the slide adjuster 306 to fit around the chest of the dog. The adjustment is easy for the user to see and complete, even for someone with dexterity that is moderately challenged.

Alternatively, the body collar 104 may be fitted to the dog before the neck collar 102.

The O-ring 202 guides the body collar 104 smoothly and keeps the two ends of the body collar 104 together, providing equal or substantially equal tension on both sides of the body and the girth of the dog. The curve of the O-ring 202 allows for the quick and smooth application of pressure around the chest of the dog when the leash 110 is pulled or the dog moves forward, while simultaneously pulling back and down at the bottom of the back of the neck of the dog when the leash 110 is pulled or the dog moves forward. The shape of the O-ring 202 and the size of the O-ring 202 and the O-ring 304 are configured to prevent the anchoring O-ring 304 from passing through the O-ring 202, but allow both the clip 308 and the collar strip 302 to pass through the O-ring 202. When the dog pulls forward, the equal pressure on the neck and chest uses the dog's strength and weight to stop the dog from continuing to pull forward. The harder the dog pulls, the stronger the pressure around its body. A very small person can control a very large dog, in this manner.

The anchoring O-ring 304 keeps the leash attachment section (the O-ring 202) on top of the dog's body making it easy to see and access.

The clip 308, which may be on the opposite side of the body collar 104 from the O-ring 304, attaches, to, either the second O-ring 202 (the O-ring 202 that is not engaging the O-ring 304 of the body collar 104, when not needed for control in the passive configuration (see FIG. 5), or goes up, through the O-ring 202 to attach to the O-ring 304, to convert the harness from a regular, static, harness, to an active restraint and training device in an active configuration (see FIG. 4). The entire body collar 104 may be removed from the neck collar 102, when the body collar 104 is not in use.

In the beginning stages of using the harness 100 with a particular dog, the body collar 104 is often used in the active configuration. As the dog learns that pulling causes pressure, the body collar 104 may be converted to the static or passive configuration. The harness 100 is ready to switch to an active configuration, with one, quick, click of the clip 308; off of the second O-ring 202 and through the second O-ring 202 and then the clip 308 is attached to the O-ring 304 of the body collar 104. The leash 110 is already attached to the O-ring 304, so this makes the conversion easy and fast. In advanced stages of training, the body collar 104 may be removed, but may be reattached at any time.

The first collar portion 204, the second collar portion 206, the third collar portion 207, and the collar strip 302 may be formed, for example, of leather, rope, cord, cotton or nylon webbing, or synthetic leather or combinations thereof. The rings 202, the ring 304, and the clip 308 may be formed, for example, of metal or plastic, or both.

Figure 8:
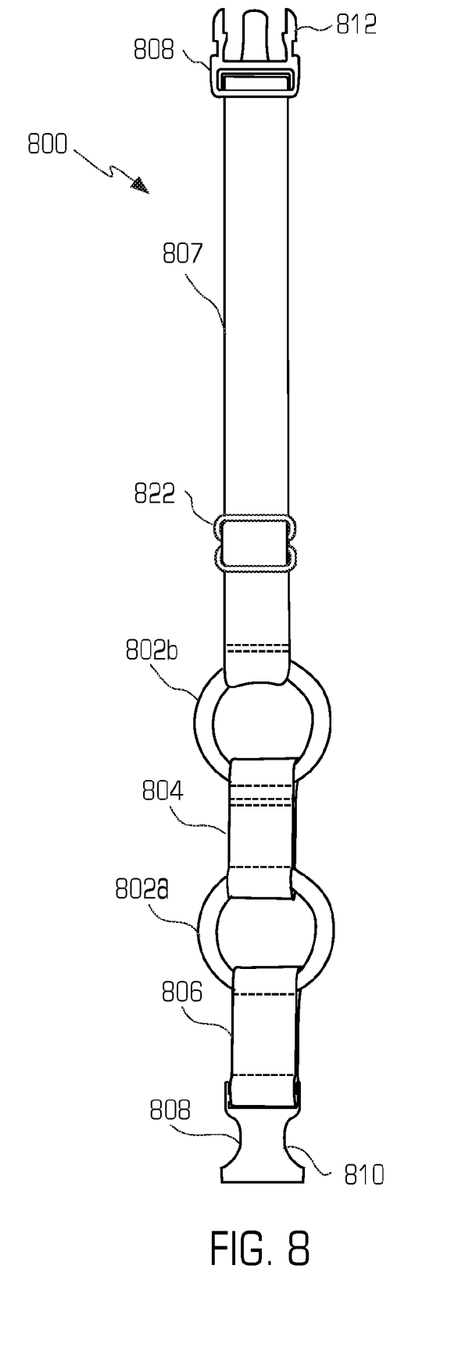
FIG. 8 is a diagram illustrating a neck collar according to another embodiment.
Figure 9:
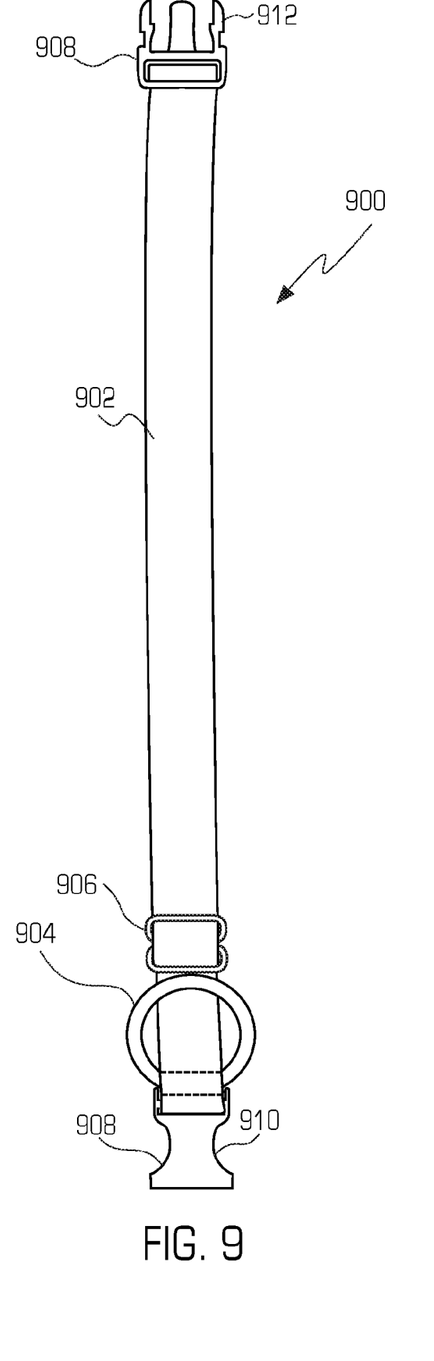
FIG. 9 is a diagram illustrating a body collar according to another embodiment.
Figure 12:
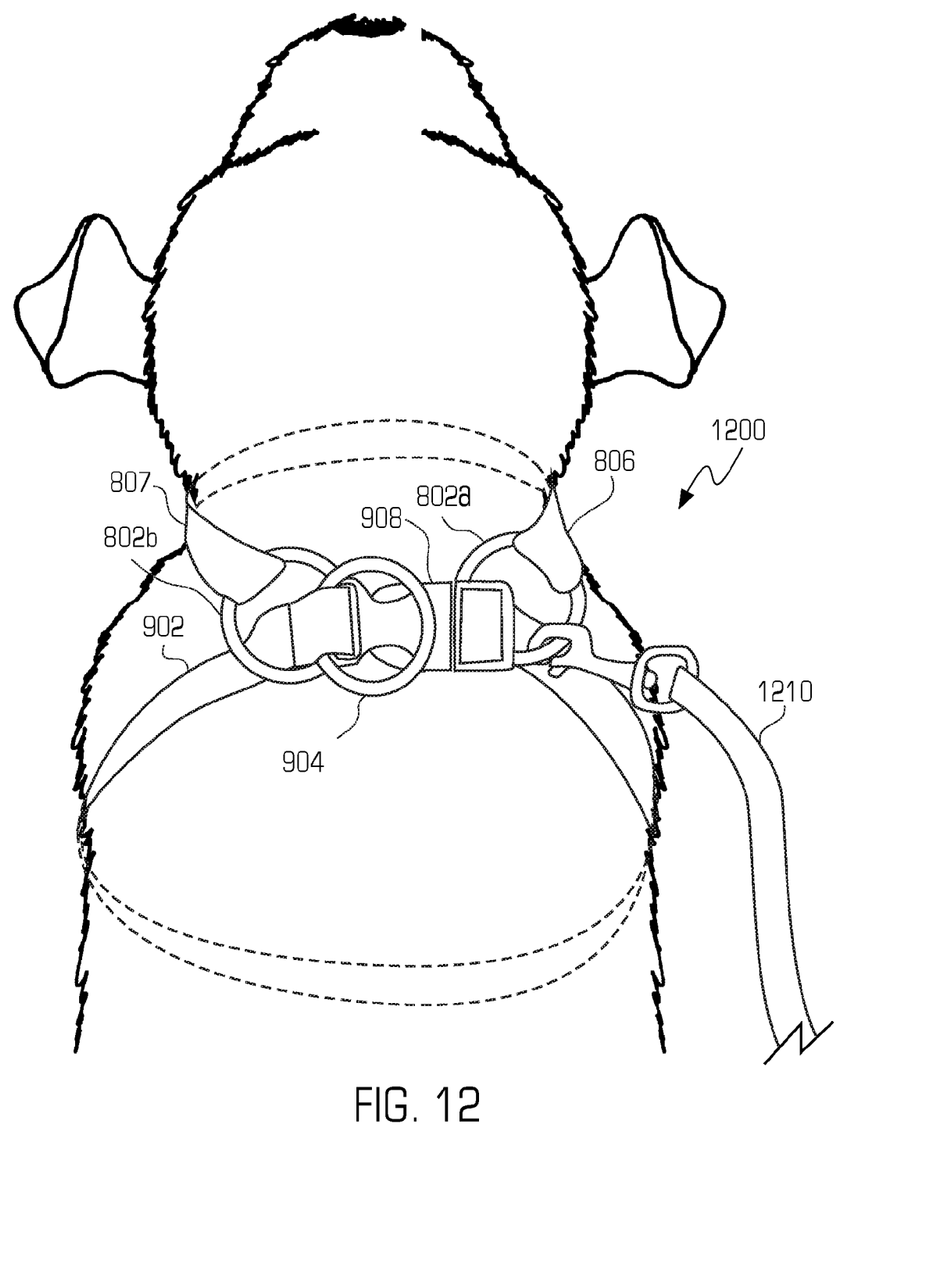
FIG. 12 is a diagram illustrating a harness formed of the neck collar of FIG. 8 and the body collar of FIG. 9 in a passive configuration.
Figure 13:
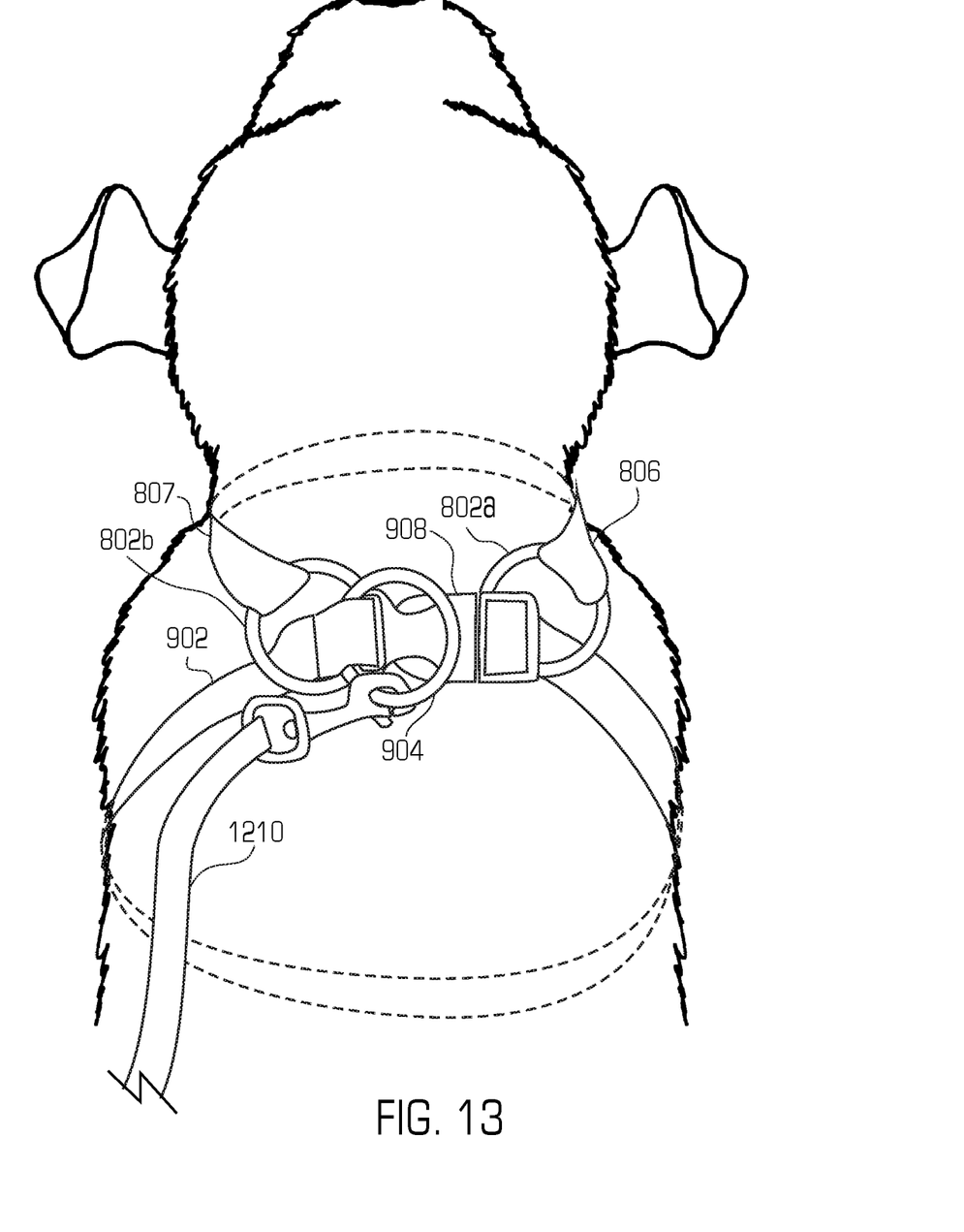
FIG. 13 is a diagram illustrating a harness formed of the neck collar of FIG. 8 and the body collar of FIG. 9 in an active configuration.

FIGS. 8 and 9 are diagrams illustrating a neck collar 800 and a body collar 900, respectively, in another embodiment of a harness. The neck collar 800 is configured to be disposed and fitted around the neck of the dog. The body collar 900 is configured to be disposed and fitted around the body of the dog. A leash (e.g., leash 1210 of FIG. 12) may be attached to the neck collar 800 or the body collar 900. The neck collar 800 comprises a collar body 801. In some embodiments, the collar body 801 comprises a plurality of O-rings 802a and 802b, a first collar portion 804, a second collar portion 806, and a third collar portion 807. Although two O-rings 802 are shown, other numbers of O-rings 802 may be used to allow sizing adjustment for the dog. The spacing between the O-rings 802 may be selected based on the size of the dog. In some embodiments, the O-rings 802 may include rings of other shapes, such as a D-ring. The neck collar 800 further comprises a buckle 808 for removably attaching the ends of the neck collar 800 together around the neck of the dog. In some embodiments, the buckle 808 is formed of a female buckle portion 810 and a male buckle portion 812. Other types of buckles may be used. Although the neck collar 800 is described as including a buckle 808, other forms of closing the collar, such as a side release buckle, a click-lock buckle, a carabiner, a seatbelt-type buckle, or Velcro fasteners may be used for securing the neck collar 800 on the dog. FIG. 8 illustrates the buckle 808 in an unfastened configuration. FIGS. 12 and 13 illustrate the buckle 808 in a fastened configuration.

Figure 10:
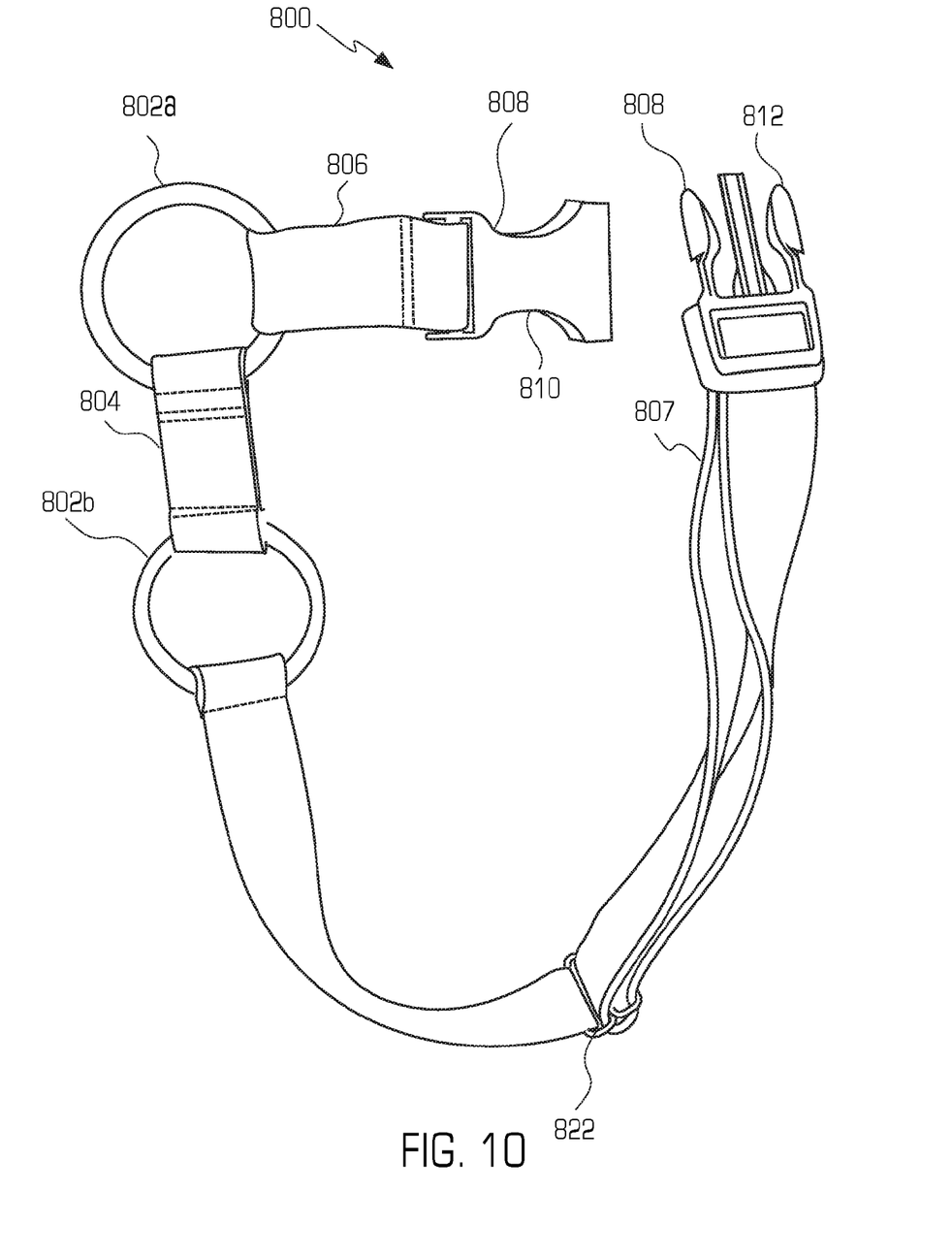
FIG. 10 is a diagram illustrating a neck collar according to yet another embodiment.

The O-ring 802a is attached to a first end of the first collar portion 804 and to a first end of the second collar portion 806. The O-ring 802b is attached to a second end of the first collar portion 804 and to a first end of the third collar portion 807. In some embodiments, the O-rings 802 are attached to the first collar portion 804 by inserting an end of the first collar portion 804 through the corresponding O-ring 802, folding the end of the first collar portion 804 to engage the first collar portion 804 and stitching the first collar portion 804 together. The O-rings 802a and 802b may be attached to the second collar portion 806 and the third collar portion 807 in a similar manner. The female buckle portion 810 and the male buckle portion 812 may be attached to a second end of the second collar portion 806 and the third collar portion 807, respectively. The neck collar 802 further comprises a slide adjuster 822 for adjusting the length of the third collar portion 807 to adjust the length of the neck collar 800. FIG. 10 is a diagram illustrating another view of the neck collar 800.

Figure 11:
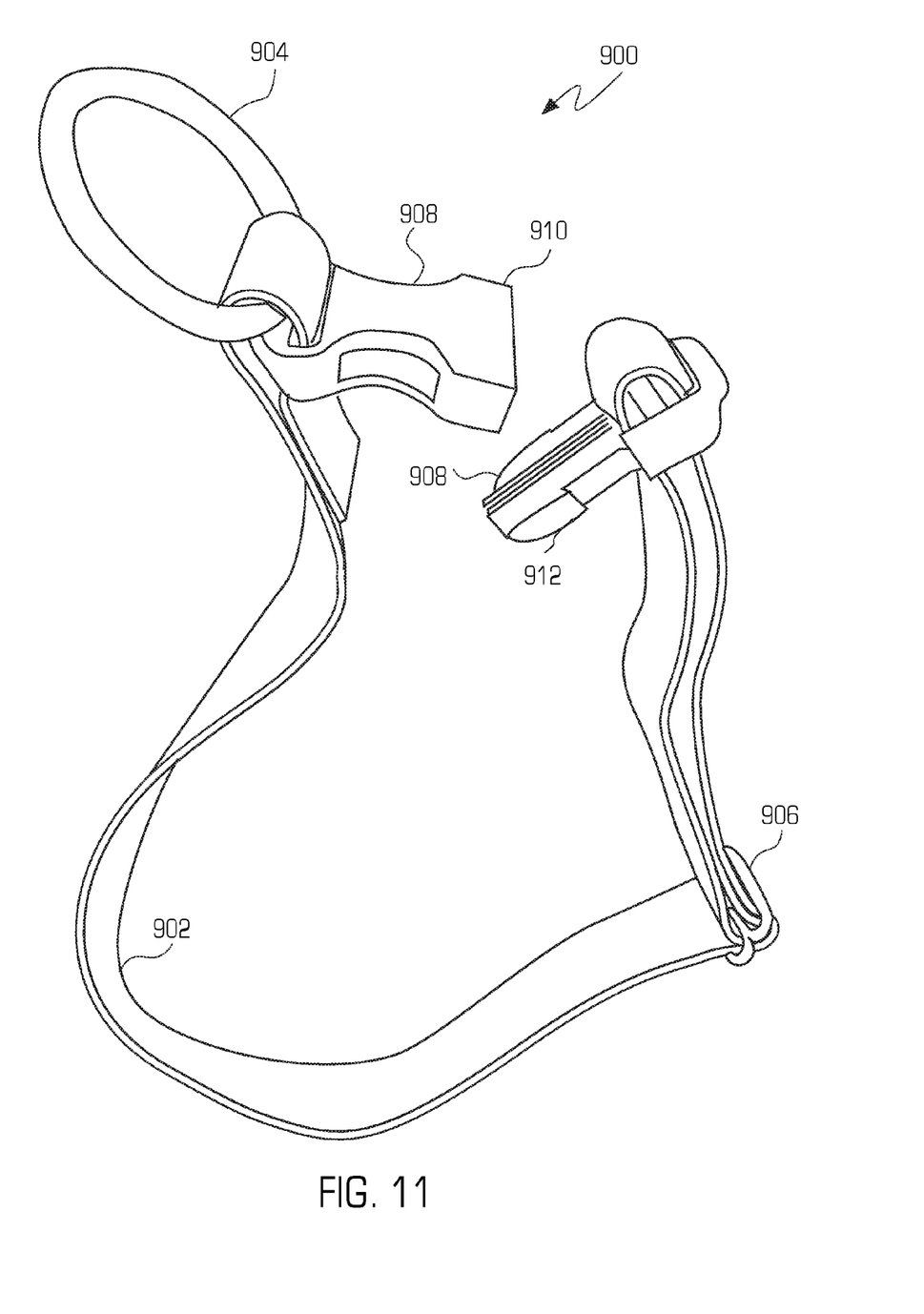
FIG. 11 is a diagram illustrating a body collar according to yet other embodiments.

Referring to FIG. 9, the body collar 900 comprises a collar strip 902, a ring 904, a slide adjuster 906, and a buckle 908. The buckle 908 allows the body collar 900 to be removably attached by buckling the ends of the body collar 900 together after the body collar 900 is placed around the body of the dog. In some embodiments, the buckle 908 is formed of a female buckle portion 910 and a male buckle portion 912 disposed on opposite ends of the collar strip 902. Other types of buckles may be used. Although the neck collar 900 is described as including a buckle 908, other forms of closing the collar, such as a side release buckle, a click-lock buckle, a carabiner, a seatbelt-type buckle, or Velcro fasteners may be used for securing the body collar 900 on the dog. The collar strip 902 is mounted on a first end to the slide adjuster 906 and mounted on a second end to the male buckle portion 912. The collar strip 902 is disposed in the ring 904 and the female buckle portion 914 and is doubled in the portion of the collar strip 902 between the ring 904 and the slide adjuster 906 so that the ring 904 is free floating in the loop formed by the doubling of the collar strip 902. In some embodiments, the ring 904 is located apart from the female buckle portion 914. In some embodiments, the ring 904 has an O-shape, and for simplicity is referred to herein as O-ring 904. In some embodiments, the outer diameter of the O-ring 904 is larger than the inner diameter of the O-rings 802. The slide adjuster 906 adjusts the length of the collar strip 902 that is used to wrap around the body of the dog in a similar manner as the slide adjuster 306 for the body collar 104, which is described above. FIG. 11 is a diagram illustrating another view of the body collar 900.

The use of the neck collar 800 and the body collar 900 are next described. The neck collar 800 is fitted around the neck of the dog, for example, with the bottom of the O ring 802 towards the tail of the dog. The user adjusts the neck collar 800 around the neck of the dog using the slide adjuster 822 and the buckle 208 in a conventional manner. The neck collar 800 may be left in place and used as a regular collar as desired.

The body collar 900 attaches at the top of the dog's body, is easy to see and easy to attach. The user first inserts the male buckle portion 912 through one of the O-rings 802 (for simplicity, the O-ring is described as O-ring 802a), and the body collar 900 is placed under and around the body of the dog and up to the other O-ring 802 (for simplicity, the O-ring is described as O-ring 802b). The male buckle portion 912 is routed up and through the O-ring 202a and buckled with the female buckle portion 912.

FIG. 12 is a diagram illustrating a harness 1200 formed of the neck collar 800 and the body collar 900 on a dog in a passive configuration. FIG. 13 is a diagram illustrating a harness 1200 formed of the neck collar 800 and the body collar 900 on a dog in an active configuration. The body collar 900 may be used in an active configuration or a passive configuration. In the active configuration for controlling the dog, a leash 1210 is attached to the O-ring 904 to allow pulling of the O-ring 904 to tighten the body collar 900 around the dog. Alternatively, the body collar 900 may be used in a passive configuration in which the leash 1210 is not attached to the O-ring 904, such as shown in FIG. 12, but the leash 1210 may be attached to one of the O-rings 802 of the neck collar 800.

The body collar 900 may be adjusted using the slide adjuster 906 to fit around the chest of the dog. The adjustment is easy for the user to see and complete, even for someone with dexterity that is moderately challenged.

Alternatively, the body collar 900 may be fitted to the dog before the neck collar 102.

The O-ring 802 guides the body collar 900 smoothly and keeps the two ends of the body collar 900 together, providing equal or substantially equal tension on both sides of the body and the girth of the dog. The curve of the O-ring 802 allows for the quick and smooth application of pressure around the chest of the dog when the leash 1210 is pulled or the dog moves forward, while simultaneously pulling back and down at the bottom of the back of the neck of the dog when the leash 1210 is pulled or the dog moves forward. The shape of the O-ring 802 and the size of the O-ring 802 and the O-ring 904 are configured to prevent the anchoring O-ring 904 from passing through the O-ring 802, but allow both the male buckle portion 912 and the collar strip 904 to pass through the O-ring 802. When the dog pulls forward, the equal pressure on the neck and chest uses the dog's strength and weight to stop the dog from continuing to pull forward. The harder the dog pulls, the stronger the pressure around its body. A very small person can control a very large dog, in this manner.

The anchoring O-ring 904 keeps the O-rings 802 on top of the dog's body making it easy to see and access.

The entire body collar 900 may be removed from the neck collar 800, when the body collar 900 is not in use.

The first collar portion 804, the second collar portion 806, the third collar portion 807, and the collar strip 902 may be formed, for example, of leather, rope, cord, cotton or nylon webbing, or synthetic leather or combinations thereof. The rings 802, the ring 904, the buckle 808, and the buckle 908 may be formed, for example, of metal or plastic, or both.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

REFERENCE NUMBERS 100 harness
102 neck collar
104 body collar
110 leash
201 collar body
202 ring
204 first collar portion
206 second collar portion
207 third collar portion
208 buckle
210 female buckle portion
212 male buckle portion
222 slide adjuster
302 Collar strip
304 Ring
306 Slide adjuster
308 Clip
800 neck collar
801 collar body
802 ring
804 first collar portion
806 second collar portion
807 third collar portion
808 buckle
810 female buckle portion
812 male buckle portion
822 slide adjuster
900 body collar
902 Collar strip
904 Ring
906 Slide adjuster
908 buckle
910 female buckle portion
912 male buckle portion
1200 harness
1210 leash

We claim:

1. A method for fitting a harness to an animal, the harness comprising a neck collar and a body collar, the method comprising:

placing the neck collar around a neck of the animal,
wherein the neck collar includes a first ring, a second ring, a first collar portion, a second portion, and a third collar portion, the first collar portion having a first end attached to the first ring and having a second end attached to the second ring, the second collar portion having a first end attached to the first ring and having a second end, the third collar portion having a first end attached to the second ring and having a second end, the second ends of the second and third collar portions being removably attachable to each other, the neck collar being configured to fit around the neck of an animal, wherein the body collar includes a collar strip, a third ring attached to a first end of the collar strip, and a clip attached to a second end of the collar strip, the collar strip being configured to be inserted through the first ring and to fit around the body of an animal, the clip being configured to be removably attached to the first ring in a first configuration and to the second ring in a second configuration;

attaching the second end of the second collar portion of the neck collar to the second end of the third collar portion of the neck collar;

inserting the collar strip of the body collar through the first ring of the neck collar;

fitting the collar strip of the body collar around the body of the animal; and selectively attaching the clip to the first ring of the neck collar in the first configuration or attaching the clip to the third ring of the body collar in the second configuration.

2. The method of claim 1, wherein the first ring is an O-ring.

3. The method of claim 2, wherein the second ring is an O-ring.

4. The method of claim 3, wherein one of the first and second rings is sized so that the third ring cannot pass through said one first or second ring.

5. The method of claim 1, wherein the second ring is an O-ring.

6. The method of claim 1, wherein the neck collar further comprises a buckle attached to the second end of the first collar portion,
wherein placing the neck collar around a neck of the animal comprises removably attaching the second end of the first collar portion to the second end of the second collar portion.

7. The method of claim 1, further comprising:
urging the clip and the third ring away from the animal to urge the body collar to apply pressure to the animal in response to said urging the clip and the third ring.

8. The method of claim 1, wherein one of the first and second rings is sized so that the third ring cannot pass through said one first or second ring.

9. A method for fitting a harness to an animal, the harness comprising a neck collar and a body collar, the method comprising:

placing the neck collar around a neck of the animal, wherein the neck collar includes a first ring, a second ring, a first collar portion, a second collar portion, and a third collar portion, the first collar portion having a first end attached to the first ring and having a second end attached to the second ring, the second collar portion having a first end attached to the first ring and having a second end, the third collar portion having a first end attached to the second ring and having a second end, the second ends of the second and third collar portions being removably attachable to each other, the neck collar being configured to fit around the neck of an animal; and a body collar including a collar strip, a third ring attached to a first end of the collar strip, a first portion of a buckle attached to the first end of the collar strip, and a second portion of the buckle attached to a second end of the collar strip, the collar strip and the second portion of the buckle being configured to be inserted through the first ring and to fit around the body of an animal, the first portion and the second portion of the buckles being configured to be removably attached to each other in a configuration of the body collar being fitted around the body of the animal attaching the second end of the second collar portion of the neck collar to the second end of the third collar portion of the neck collar;

inserting the second portion of the buckle of the body collar through the first ring of the neck collar; and fitting the collar strip of the body collar around the body of the animal;

inserting the second portion of the buckle of the body collar through the second ring of the neck collar; and attaching the second portion of the buckle to the first portion of the buckle.

10. The method of claim 9, wherein the first ring is an O-ring.

11. The method of claim 10, wherein the second ring is an O-ring.

12. The method of claim 11, wherein one of the first and second rings is sized so that the third ring cannot pass through said one first or second ring.

13. The method of claim 9, wherein the second ring is an O-ring.

14. The method of claim 9, wherein the neck collar further comprises a buckle including a first portion coupled to the second end of the second collar portion and a second portion coupled to the second end of the third collar portion.

15. The method of claim 9, wherein the first ring and the second ring are spaced apart to provide equal or substantially equal tension on the body collar while the body collar is on the animal to apply equal pressure on a neck and both sides and underside of a girth of the body of the animal.

16. The method of claim 9, further comprising urging the third ring away from the animal to urge the body collar to apply pressure to the animal in response to said urging the third ring.

17. The method of claim 9, further comprising selectively attaching a leash to the first ring or second ring of the neck collar in a passive configuration or attaching the clip to the third ring of the body collar in an active configuration.

18. The method of claim 9, wherein one of the first and second rings is sized so that the third ring cannot pass through said one first or second ring.

\* \* \* \* \*